(12) United States Patent
Herlin et al.

(10) Patent No.: US 10,736,468 B2
(45) Date of Patent: Aug. 11, 2020

(54) PACKAGING CONTAINER WITH RIM AND LID

(71) Applicant: Å&R Carton Lund Aktiebolag, Lund (SE)

(72) Inventors: Henrik Herlin, Kristianstad (SE); Simon Holka, Staffanstorp (SE); Eva Sunning, Lund (SE)

(73) Assignee: Å&R Carton Lund Aktiebolag (SE)

( * ) Notice: Subject to any disclaimer, the term of this patent is extended or adjusted under 35 U.S.C. 154(b) by 0 days.

(21) Appl. No.: 15/549,019

(22) PCT Filed: Feb. 2, 2016

(86) PCT No.: PCT/SE2016/050076
§ 371 (c)(1),
(2) Date: Aug. 4, 2017

(87) PCT Pub. No.: WO2016/126191
PCT Pub. Date: Aug. 11, 2016

(65) Prior Publication Data
US 2018/0020876 A1    Jan. 25, 2018

(30) Foreign Application Priority Data
Feb. 5, 2015 (SE) ...................................... 1550128

(51) Int. Cl.
*A47J 47/04* (2006.01)
*B65D 3/30* (2006.01)
(Continued)

(52) U.S. Cl.
CPC ................ *A47J 47/04* (2013.01); *B65D 3/04* (2013.01); *B65D 3/12* (2013.01); *B65D 3/30* (2013.01);
(Continued)

(58) Field of Classification Search
CPC ........ B65D 15/08; B65D 3/12; B65D 43/169; B65D 51/20; B65D 51/247;
(Continued)

(56) References Cited

U.S. PATENT DOCUMENTS 1,955,865 A   4/1934 Wellman
2,706,074 A   4/1955 La Grua et al.
(Continued)

FOREIGN PATENT DOCUMENTS

CH         453117 A     5/1968
CN       1914096 A     2/2007
(Continued)

OTHER PUBLICATIONS

International Search Report for Application No. PCT/SE2016/050076 dated Jun. 7, 2016, 5 pages.
(Continued)

*Primary Examiner* — Christopher R Demeree
(74) *Attorney, Agent, or Firm* — Lerner, David, Littenberg, Krumholz & Mentlik, LLP

(57) ABSTRACT

A paperboard packaging container for bulk solids includes a container body having a container wall extending from a container bottom edge to a container body opening and having an inner surface facing an inner compartment in the packaging container, and a lid for closing the container body opening. An upper reinforcing rim is applied at the container body opening and extends along the opening edge, defining a perimeter of a container access opening and is joined to the inner surface of the container wall by means of a weld seal which extends around the container body opening and has an upper edge including a first abutment surface arranged to abut against a second abutment surface on an inner lid surface with the lid in a closed position on the container (Continued)

access opening and form a tight seal between the rim and the lid with the lid in the closed position.

20 Claims, 8 Drawing Sheets

(51) Int. Cl.
| | |
|---|---|
| *B65D 8/00* | (2006.01) |
| *B65D 51/24* | (2006.01) |
| *B65D 43/16* | (2006.01) |
| *B65D 43/02* | (2006.01) |
| *B65D 51/22* | (2006.01) |
| *B65D 3/04* | (2006.01) |
| *B65D 21/02* | (2006.01) |
| *B65D 3/12* | (2006.01) |
| *B65D 77/20* | (2006.01) |
| *B65D 51/20* | (2006.01) |

(52) U.S. Cl.
CPC ............ *B65D 15/06* (2013.01); *B65D 15/08* (2013.01); *B65D 21/023* (2013.01); *B65D 43/02* (2013.01); *B65D 43/169* (2013.01); *B65D 51/20* (2013.01); *B65D 51/228* (2013.01); *B65D 51/246* (2013.01); *B65D 51/247* (2013.01); *B65D 77/2024* (2013.01); *B65D 2251/009* (2013.01); *B65D 2251/0021* (2013.01); *B65D 2251/0028* (2013.01); *B65D 2251/0093* (2013.01); *B65D 2251/1016* (2013.01); *B65D 2251/1058* (2013.01); *B65D 2543/00101* (2013.01); *B65D 2543/00138* (2013.01); *B65D 2543/00148* (2013.01); *B65D 2543/00296* (2013.01); *B65D 2543/00351* (2013.01); *B65D 2543/00435* (2013.01); *B65D 2543/00527* (2013.01); *B65D 2543/00537* (2013.01); *B65D 2543/00564* (2013.01)

(58) Field of Classification Search
CPC ........ B65D 77/2024; B65D 2251/0021; B65D 2251/0093; B65D 2251/1058; B65D 2543/00101; B65D 2543/00148; B65D 2543/00296; B65D 2543/00351; B65D 2543/00435; B65D 2543/00527; B65D 2543/00537; B65D 2543/00564; B65D 2543/00092
USPC .............. 229/123.1, 125.08, 125.13; 53/471; 220/254.3, 203.05, 315, 810
See application file for complete search history.

(56) References Cited

U.S. PATENT DOCUMENTS

| | | | |
|---|---|---|---|
| 3,042,288 A | 7/1962 | Carpenter, Sr. | |
| 3,670,951 A | 6/1972 | Smith | |
| 3,712,530 A | 1/1973 | Croley | |
| 4,883,193 A * | 11/1989 | Christensson | B65D 15/22 220/266 |
| 4,917,289 A | 4/1990 | Linnemann et al. | |
| 5,244,108 A | 9/1993 | Hale | |
| 5,743,422 A | 4/1998 | Hale | |
| 6,688,515 B1 * | 2/2004 | Huffman | B32B 27/10 229/125.08 |
| 8,308,008 B2 | 11/2012 | Perry et al. | |
| 8,627,981 B2 | 1/2014 | Perry et al. | |
| D781,700 S * | 3/2017 | Middleton | D9/424 |
| 9,637,287 B2 * | 5/2017 | Sagy | B65D 51/20 |
| 9,834,341 B2 * | 12/2017 | Giraud | B65D 43/22 |
| 9,834,347 B2 * | 12/2017 | Larsson | B65D 51/228 |
| 2006/0156811 A1 | 7/2006 | Borowski et al. | |
| 2007/0145001 A1 | 6/2007 | Tilton | |
| 2008/0041861 A1 | 2/2008 | Crawford et al. | |
| 2009/0230177 A1 | 9/2009 | Robertson et al. | |
| 2011/0006066 A1 | 1/2011 | Vandamme et al. | |
| 2011/0036868 A1 | 2/2011 | Gotoh et al. | |
| 2011/0186570 A1 | 8/2011 | Perry et al. | |
| 2011/0192847 A1 | 8/2011 | Vandamme | |
| 2011/0266297 A1 | 11/2011 | Thorpe et al. | |
| 2012/0061413 A1 | 3/2012 | Dols et al. | |
| 2014/0131355 A1 | 5/2014 | Jentis et al. | |

FOREIGN PATENT DOCUMENTS

| | | |
|---|---|---|
| CN | 101372271 A | 2/2009 |
| CN | 101848843 A | 9/2010 |
| CN | 101870387 A | 10/2010 |
| CN | 102712394 A | 10/2012 |
| CN | 204021483 U | 12/2014 |
| EP | 0006652 A1 | 1/1980 |
| EP | 0312513 A2 | 4/1989 |
| EP | 0442433 A1 | 8/1991 |
| EP | 0781709 A1 | 7/1997 |
| EP | 2527265 A1 | 11/2012 |
| EP | 2716551 A1 | 4/2014 |
| GB | 2096116 A | 10/1982 |
| GB | 2261655 A | 5/1993 |
| JP | H10329863 A | 12/1998 |
| JP | 2009286403 A | 12/2009 |
| WO | 2004048213 A1 | 6/2004 |
| WO | 2014129887 A1 | 8/2014 |

OTHER PUBLICATIONS

International Search Report for Application No. ITS/SE15/00023 dated Sep. 28, 2015, 6 pages.
Extended Search Report for Application No. 16746905.5 dated Oct. 11, 2018, 9 pages.
Search Report from Chinese Office Action for CN20168008607.1 dated Aug. 27, 2018.
Extended European Seach Report for Application No. 19186762.1 dated Oct. 22, 2019, 7 pages.

* cited by examiner

PACKAGING CONTAINER WITH RIM AND LID

CROSS-REFERENCE TO RELATED APPLICATIONS

The present application is a national phase entry under 35 U.S.C. § 371 of International Application No. PCT/SE2016/050076 filed Feb. 2, 2016, published in English, which claims priority from Swedish Application No. 1550128-1 filed Feb. 5, 2015, all of which are incorporated by reference.

TECHNICAL FIELD

The invention pertains to a packaging container for bulk solids, such as granulated or pulverulent foodstuffs, the container comprising a container body comprising a container wall extending from a container bottom to a container body opening in a height direction of the container, and a closure arrangement comprising a lid. The container wall has an inner surface facing towards an inner compartment in the packaging container and an outer surface facing away from the inner compartment and an opening edge at the container body opening. An upper reinforcing rim is applied to the container body at the container body opening and extends along the opening edge, thus defining a perimeter of a container access opening.

BACKGROUND OF THE INVENTION

In the area of packaging of consumer goods, and in particular when packaging dry flowable pulverulent consumer goods it is common to use rigid paperboard packaging containers which serve as protective transport and storage containers at the retail end and as storage and dispensing containers at the consumer end. Such paperboard containers are usually provided with an openable and closable lid, and with an inner removable or breakable barrier membrane which keeps the contents fresh and protected against contamination up until delivery of the packaging container to a consumer. Once the inner barrier has been destroyed in order to access the contents in the packaging container, the ability of the packaging container to protect the contents from detrimental influence from the environment depends strongly on the lid construction. Accordingly, it is a concern that the packaging container can continue to keep the contents in the packaging container fresh and protected against contamination from the outside also after the inner barrier has been removed. It is a particular concern that the packaging container may be repeatedly opened to access the contents in the container and be re-sealed to allow hygienic storage of the contents in the package between dispensing occasions. A packaging container for bulk solids usually contains more of the packaged product than will be used at each dispensing occasion. Thus, it is desirable that the product remaining in the packaging container retains properties such as flavor, scent, scoopability, vitamin content, color, etc. at least for a time period corresponding to the time it is expected it will take for a consumer to use up all the contents in the packaging container.

It is therefore an object of the present invention to offer a paperboard packaging container having improved capability of protecting dry bulk solids in the paperboard packaging container against negative influence from the environment outside the packaging container also after the packaging container has been opened a first time.

SUMMARY OF THE INVENTION

According to the invention, there is offered a paperboard packaging container for bulk solids, in accordance with claim 1. Further embodiments are set out in the dependent claims. The container comprises a container body comprising a container wall extending from a container bottom edge to a container body opening in a height direction of the container, and a closure arrangement comprising a lid, the container wall having an inner surface facing towards an inner compartment in the packaging container and an outer surface facing away from the inner compartment, the container body having an opening edge at the container body opening, and an upper reinforcing rim being applied to the container body at the container body opening the upper reinforcing rim extending along the opening edge and defining a perimeter of a container access opening. In the paperboard packaging container as disclosed herein:

the upper reinforcing rim is joined to the inner surface of the container wall by means of a weld seal, the weld seal extending around the container body opening;

the upper reinforcing rim has an extension in the height direction of the container and comprises a lower edge facing towards the container bottom and an upper edge facing away from the container bottom;

the upper edge of the upper reinforcing rim comprises a first abutment surface;

the lid comprises an inner lid surface facing towards the container bottom when the lid is in a closed position on the container opening and an outer lid surface facing away from the container bottom when the lid is in a closed position on the container access opening;

the inner surface of the lid comprises a second abutment surface;

the first abutment surface on the upper reinforcing rim is arranged to abut against the second abutment surface on the lid when the lid is in the closed position on the container access opening and to form a seal between the plastic rim and the lid when the lid is in the closed position over the container access opening.

By joining the upper reinforcing rim to the inner surface of the container wall by means of welding, it is possible to obtain a tighter and slimmer attachment than is possible with an adhesive attachment. The welded reinforcing rim is preferably a plastic rim and connects the inner surface of the container wall with the inner surface of the container lid and contributes to create a continuous barrier from the container wall to the container lid. The weld seal forms a first seal between the upper reinforcing rim and the container wall and the first and second abutment surfaces form a second, gasketing seal between the upper reinforcing rim and the lid. The first seal is a permanent seal which is present at all times and the second seal is an openable seal which is present only when the lid is closed on the container access opening and the first and second abutment surfaces are pressed against each other.

The welding process provides a highly controlled way of creating an optimal join between the plastic rim and the paperboard container wall. The join is made by supplying energy to heat and locally soften or melt one or more thermoplastic component in the plastic rim and/or on the inner surface of the container wall and by pressing the plastic rim and the container wall together in a direction perpendicular to the container wall. The thermoplastic material used to create the weld seal may be provided by the plastic rim, by a thermoplastic film or coating on the inner surface of the container wall, or by both the plastic rim and by a thermoplastic film or coating on the inner surface of the container wall. It may be preferred that the plastic rim is made from thermoplastic material. A thermoplastic rim may be produced by any suitable melt-forming process known in the art, such as injection molding. By controlling weld temperature, pressure and weld time, it is possible to adapt the welding process to the welded materials and to obtain a weld seam with a required level of tightness. Accordingly, the welding process is accurate and predictable and is an efficient way of producing a reliable seal with a predetermined level of tightness. A preferred welding method for the weld seal between the upper reinforcing rim and the paperboard packaging container body may be high frequency welding.

As used herein, a paperboard packaging container is a packaging container wherein the container body is formed from paperboard web material. The paperboard container may be formed in any manner known in the art, e.g. by forming a container body by bending a paperboard web material into a tubular shape and longitudinally closing the tube by joining overlapping or abutting side edges of the paperboard material. The join between the side edges may be covered by a sealing strip. The container bottom may be formed from a separate bottom disc which is attached at one end of the container body tube or may be formed by folding an end portion of the container body tube.

As used herein, a paperboard material is a web material predominantly made from cellulose fibers or paper fibers. The web material may be provided in the form of a continuous web or may be provided as individual sheets of material. The paperboard material may be a single ply or multi ply material and may be a laminate comprising one or more layers of materials such as polymeric films and coatings, metal foil, etc. The polymeric films and coatings may include or consist of thermoplastic polymers. The paperboard material may be coated, printed, embossed, etc. and may comprise fillers, pigments, binders and other additives as known in the art. The paperboard materials as disclosed herein may also be referred to as cardboard or carton materials.

As used herein, the term "bulk solids" refers to a pulverulent solid material, e.g. in the form of particles or powder. The bulk material may be dry or moist. Bulk solids in the context of the present application may be digestible, such as infant formula, coffee, tea, rice, flour, sugar, cereals, soup powder, custard powder, or the like. Alternatively, the bulk solids may be non-digestible, such as tobacco, detergent, fertilizer, chemicals or the like.

By a pulverulent material as used herein is implied any material in the form of particles, granules, grinds, plant fragments, short fibres, flakes, seeds, etc.

By an openable or peelable sealing membrane is meant a membrane that may be fully or partly removed by a user in order to provide initial access to an interior compartment of the packaging container either by breaking a seal between the sealing membrane and the inner surface of the container wall, or by tearing or otherwise breaking the sealing membrane itself.

A peelable or tearable sealing membrane may be gastight or gas-permeable. A gastight membrane may be manufactured from any material or material combination suitable for providing a gastight sealing of a compartment delimited by the sealing membrane, such as aluminium foil, silicon-coated paper, plastic film, or laminates thereof. A gastight membrane is advantageous when the bulk solids stored in the packaging container are sensitive to air and/or moisture, and it is desirable to avoid contact of the packaged bulk solids with ambient air.

The barrier properties of the packaging containers disclosed herein, may be designed to meet different requirements of tightness depending on the goods which is packaged in the packaging container. By way of example, in a packaging container for dried peas a lower barrier level may be sufficient than in a packaging container for e.g. infant formula which is highly sensitive to oxygen and moisture exposure. A combination of a gas-tight gasketing seal between the upper edge of the upper reinforcing rim and the inner surface of the container lid, and a gas-tight weld seal between the upper reinforcing rim and the inner surface of the container wall may offer a packaging container with excellent barrier properties also after the sealing membrane has been removed.

A gastight packaging container is particularly advantageous when the pulverulent material stored in the packaging container is sensitive to air and/or moisture. It may also be desirable to keep fragrances and aromas in the packaging container and prevent the packaged contents from taking up scents and flavours from the ambient air.

The packaging containers as disclosed herein may preferably have barrier properties which remain largely unaltered even after removal of the inner sealing membrane. In other words, the contents in a closed packaging container may be equally well protected or nearly equally well protected regardless of whether the inner sealing membrane has been removed or not. This also means that permanent and temporary seals such as the seal created by between the lid and the upper reinforcing rim and the weld seal between the upper reinforcing rim and the inner wall of the packaging container preferably have barrier properties offering the same level of protection of the packaged contents as the inner sealing membrane and other container components which separate the contents in the container from the environment outside the packaging container.

Plastic components such as the upper reinforcing rim and the container lid may comprise a high-barrier polymer material. The high-barrier polymer material may be present as an inner layer in the plastic component. A plastic component having excellent barrier properties may be formed by an injection-molding process where an inner layer of EVOH is formed in a polyolefin component such as polypropylene, PP, or polyethylene PE.

A packaging container having a volume of approximately 1 l may be considered to be gas-tight if it provides an oxygen barrier of approximately 0.006 cc oxygen/24 h or less at 23° C. and 50% relative humidity.

The packaging containers as disclosed herein are containers for bulk solids, which are flowable pulverulent materials capable of being poured or scooped out of the containers. The containers are generally disposable containers, which are discarded when they have been emptied of their contents. A concern in packaging containers for pulverulent bulk solids is that the containers are sufficiently tight or at least "sift-proof" to prevent the pulverulent material from escaping out of the container for example through a join between an upper reinforcing rim and the container wall. It has now been found that by welding a reinforcement rim to the inner surface of the container wall, a more reliably sift-proof join between the rim and the carton wall can be achieved, than with an adhesive seal. Furthermore, an adhesive seal requires a further component to be added to the packaging container as well as equipment for supplying and applying the adhesive. Consequently, a gluing process is generally more expensive and time-consuming than a weld process.

As it may be desired to avoid applying adhesive inside the packaging container, e.g. in order to avoid contact between the adhesive and the contents packaged in the container, previously known reinforcement rims are glued to the outside wall of the packaging container and commonly have a generally U-shaped cross-sectional profile with an outer leg or flange extending downwardly on the outside of the container wall and an inner leg or flange extending downwardly on the inside of the container walls. Such reinforcement rims are complicated and relatively expensive structures and are difficult to fit over a paperboard container edge without damaging the edge. Furthermore, it has proven difficult to create a sift-proof adhesive seal between the reinforcing rim and the container wall, much less a satisfactory fluid proof or moisture proof seal.

By arranging the seal between the container wall and the reinforcing rim on the inside of the container wall as disclosed herein, the join between the reinforcement rim and the container wall forms a continuous barrier on the inside of the container. The plastic reinforcement rim is more rigid than the container wall and constitutes a shape stable continuation of or supplement to the paperboard container wall and provides a first abutment surface which is resistant to deformation when pressed against the second abutment surface on the lid and permits the packaging container to be repeatedly opened and closed without risk of damaging the opening edge and thereby impairing container tightness. The effective weld seal between the reinforcing rim and the inner surface of the container wall in conjunction with the non-deformable abutment surface on the reinforcement rim provide a container as disclosed herein with improved resealability and tightness after a first opening of the container by a consumer and after any internal sealing membrane or other transport seals have been broken.

The upper reinforcing rim may have any suitable cross-sectional profile such as a generally I-shaped cross-sectional profile, a generally wedge-shaped or tapering cross-sectional profile or a cross-sectional profile in the form of an inverted L-shape with a first leg extending downward in the container on the inner surface of the container wall and a second leg extending over and covering the paperboard container wall edge. The downwardly extending leg of an L-shaped upper reinforcing rim may have different thickness in different parts of the reinforcing rim, as disclosed herein. It may be preferred that no part of the upper reinforcing rim extends downward on the outer surface of the paperboard container wall. A generally I-shaped or L-shaped upper reinforcing rim may be preferred as it is easy to insert into the container body opening and to attach to the container wall by welding and application of pressure perpendicular to the container body wall. In addition to the first abutment surface which is arranged to be in direct contact with a corresponding second abutment surface on the inner surface of the container lid to create a seal between the upper reinforcing rim and the lid, the upper reinforcing rim may be configured with means for retaining the lid in a closed position. Such means may be constituted by snap-lock arrangements including mating ridges and grooves on the rim and on the lid, female/male locking elements, etc. as known in the art.

As set out herein, the weld seal between the upper reinforcing rim and the container wall as well as the seal between the first and second abutment surfaces are preferably sift-proof seals, more preferably moisture-proof seals and most preferably gas-tight seals. The level of tightness of the second seal, i.e. the seal between the first and second abutment surfaces may be controlled by selecting a resilient material for one or both abutment surfaces, by ascertaining that the second seal is a continuous seal and by providing the container closure arrangement with means for retaining the lid in the closed position over the access opening. Such retaining means which may include mating ridges and grooves on the lid and on the rim or a frame structure, female/male locking elements, etc. are preferably arranged to keep the first and second abutment surfaces pressed together.

A higher level of tightness of the container and any container seals may be desirable when the packaged goods is moisture sensitive and/or is sensitive to degradation when exposed to ambient air. It may also be desirable that the packaging container is aroma-proof in order to preserve flavours and aromas in the packaged goods and to prevent the packaged goods from taking up flavours and aromas from outside the packaging container.

The upper edge of the upper reinforcing rim may be arranged above the container body opening edge in the height direction of the packaging container. In this manner, no part of the paperboard container wall may come into contact with the inner surface of the container lid. The part of the reinforcing rim extending past the container body wall in the height direction of the container will also serve as a protection for the paperboard edge of the container wall and shield it from being deformed or otherwise damaged in a production and filling process, and when opening and closing the container lid.

In order to achieve a seal with a high level of tightness, the weld seal between the upper reinforcing rim and the container wall preferably extends continuously around the container body opening. However, if a seal with a lower level of tightness is sufficient, such as when it is only required that the seal is sift-proof and prevents the pulverulent contents in the packaging container from escaping past the weld seal, an intermittent weld seal may provide a satisfactory seal.

The paperboard packaging container may further comprise a frame structure, which is applied to the packaging container at the container body opening edge and which is mechanically connected to the upper reinforcing rim. A mechanical connection between the upper reinforcing rim and the frame structure may be accomplished by mating contours on the upper reinforcing rim and on the frame structure. Such mating contours preferably include snap-fit features such as interengaging ridges and tracks or protrusions and holes/cavities, etc. The mechanical connection between the upper reinforcing rim and the frame structure is preferably irreversible implying that once established the connection can only be broken by destroying or damaging the connected parts.

The container lid may be provided as a separate component which can be completely removed when opening the container. Alternatively, the container lid may be attached to the frame structure by means of a hinge. The hinge may be a live hinge, i.e. a bendable connection between the lid and the frame structure. A live hinge may be formed integral with the lid and/or with the frame structure or may be a separately formed element which is attached to the container lid and to the frame structure. Alternatively, the hinge may be a two-part hinge, with a first hinge part arranged on the container lid and a second hinge part arranged on the frame structure.

The frame structure may form part of a lid component, the lid component further comprising a lid part which is connected to the frame structure by a hinge as set out above. The lid part may be a complete lid or may be only part of a lid, which is assembled with one or more additional lid parts to form the container lid. By way of example, the lid part may be an outer lid part defining the shape and size of the portion of the lid which is exposed to the exterior of the packaging container and which is combined in the container lid with an inner lid part such as an inner gasketing disc which provides the second abutment surface in the seal between the lid and the upper reinforcing rim. The inner gasketing disc may be made from carton, plastic, or any suitable laminate.

By providing the frame structure or a lid component as a part which is separate from the upper reinforcing rim, the frame structure or lid component may be attached to the upper rim at a late stage in a process for producing and filling the packaging container. A frame structure or lid component may have a three-dimensional profiled shape, with stacking features, decorative relief elements, locking elements, and other aberrations and irregularities. Furthermore, a lid part may have a non-planar surface, such as a rounded surface or an irregularly shaped surface. All such three-dimensional features may make the packaging container difficult to handle in a filling process and put restrictions on the way the packaging container can be assembled and filled. By way of example, a packaging container which has been provided with a profiled non-planar upper surface, such as a non-planar outer lid surface, cannot subsequently be filled from the bottom of the container, as the container cannot rest safely on the non-planar surface when filling the container. Moreover, plastic components having a complicated three-dimensional shape are comparatively expensive to manufacture, and can easily be damaged in a process where a packaging container is assembled and filled. By applying the frame structure or lid component after filling and closing the container, it may be possible to lower the number of packaging containers which are damaged in the process and which have to be discarded. Accordingly, an upper closure comprising a lid and a two-part rim/frame construction as disclosed herein may serve to keep waste at a lower level than is possible with conventional single part rim constructions. The upper rim as disclosed herein has a simple shape without protruding features that may be damaged in a production process. Furthermore, the upper rim may serve as a support and reinforcement of the container body during a manufacturing and filling process and will, in particular, protect the container body paperboard edge from damage during the process. In the finished paperboard container, the upper rim contributes to stabilise the container body during transport and storage.

The paperboard packaging container as disclosed herein may comprise an inner peelable or openable sealing membrane forming a cross-sectional seal between an inner compartment in the container body and the container opening. The inner peelable or openable sealing membrane is a transport and storage seal which is eventually broken or removed by an end user of the packaging container.

By an openable or peelable sealing membrane is meant a membrane that may be fully or partly removed by a user in order to provide access to an interior compartment of the packaging container either by breaking a seal between the sealing membrane and the inner surface of the container wall, or by tearing or otherwise breaking the sealing membrane itself. Tearable sealing membranes may be provided with one or more predefined weakenings, such as perforations or a cut partly through the membrane.

A peelable or tearable sealing membrane may be gastight or gas-permeable. A gastight membrane may be manufactured from any material or material combination suitable for providing gastight sealing of a compartment delimited by the sealing membrane, such as aluminium foil, silicon-coated paper, plastic film, or laminates thereof. A gastight membrane is particularly advantageous when the bulk solids stored in the packaging container are sensitive to air and/or moisture, and provides additional protection of the packaged goods before a first opening of the packaging container by a presumptive consumer.

It may be preferred that the inner peelable or openable sealing membrane is a gas-tight peelable or openable sealing membrane. It may also be preferred that the packaging container is a gas-tight packaging container.

In the paperboard packaging container as disclosed herein, one or both of the first and second abutment surfaces may be constituted by a resiliently compressible material, such as natural or synthetic rubber. A resilient abutment surface contributes to forming a tight gasketing seal between the lid and the upper rim.

The closure arrangement on the paperboard packaging container as disclosed herein may comprise a locking arrangement which is configured to maintain the lid in a closed position at the container access opening.

The locking arrangement may comprise a first locking element arranged on a frame structure if present, on the container body or on the upper reinforcing rim and a second locking element arranged on the container lid. The first and second locking elements may be mating locking elements, such as female/male locking elements including hooks and other protrusions which are arranged to interengage with ridges, hooks, tracks, holes, cavities, loops, etc. By way of example, a locking arrangement may be provided by a locking flap or clasp closure extending from an edge on the lid, such as from a forward edge on the lid and comprising at least one locking element which can be fastened into or onto a corresponding locking element on the container body or on the upper reinforcement rim or on a frame structure. The locking elements are preferably designed to allow repeated opening and closing of the locking arrangement. Manipulation of the locking arrangement may be facilitated by means of gripping devices such as finger grips, friction enhancing elements, pull tabs, etc.

Furthermore, the locking arrangement may comprise a first profiled element on the lid which first profiled element is configured to releasably engage with a second profiled element on the upper rim and/or on a frame structure being connected to the upper reinforcing rim.

As set out herein, the closure between the container lid and the edge rim or opening edge is preferably sift-proof and most preferably also gas tight or at least substantially gas tight. A tight closure between the container lid and the edge rim may be enhanced by mating contours on the lid and on the rim and may include snap-fit features such as interengaging ridges and tracks or protrusions and holes/cavities, etc.

The inner lid surface of the paperboard packaging container as disclosed herein may be constituted by an inner gasketing lid part. The inner gasketing lid part may be a planar disk, and may be formed of any suitable material, such as paperboard, plastic, laminated paperboard, etc. The inner gasketing lid part preferably comprises resilient material which may be provided as a resilient coating or layer on the surface forming the inner lid surface. A resilient material may form a coating or layer over all or part of the inner lid surface but should preferably be applied at least within the area of the inner lid surface constituting the second abutment surface. A corresponding coating or layer of a resilient material may be present on the first abutment surface on the upper reinforcing rim.

The inner gasketing lid part may be attached to an outer lid part by adhesive or welding. However, it may be preferred that the inner gasketing lid part is mechanically attached to the outer lid part, such as by being snapped into a groove extending along the edge of the outer lid part, on an inner surface thereof.

In a paperboard packaging container as disclosed herein, an inner profile of the reinforcing rim defines a shape and a size of the access opening, whereby the access opening is smaller than the container body opening. The opening area of the access opening is preferably from 85% to 99% of the container body opening area, such as from 90% to 98% of the container body opening area or from 94% to 97% of the container body opening area. The reinforcing rim preferably builds as little as possible into the container opening, such that the size of the access opening is maximized. A slim reinforcing rim and a large access opening make the contents in the packaging container easily accessible and contribute to facilitate scooping or pouring of the contents out of the container. Furthermore, a slim inner reinforcing rim minimizes the risk that pulverulent material is caught on the lower rim edge or between the rim and the container wall. A user opening a packaging container and seeing a soiled inner ring, will perceive the packaging container as being messy and less hygienic than desired. Furthermore, it is generally desired to keep the packaged pulverulent material away from the access opening where it is more exposed to contamination as it may more easily come into contact with the hands of a person opening the packaging container and removing contents through the access opening. Contaminated contents in the packaging container which are caught on the upper reinforcement rim may fall back into the container and may, in turn, contaminate the remaining contents in the container. In addition to the inner reinforcing rim being slim, the inwardly directed surface of the reinforcing rim is preferably generally smooth, without irregularities such as ridges and protrusion on which pulverulent contents in the container may get caught.

If the packaging container is provided with a frame structure which is mechanically connected with the upper reinforcing rim, it may be preferred that no part of the frame structure extends into the access opening and detracts from the area of the access opening. The frame structure may then serve to provide features such as a lid hinge, means for retaining the lid in a closed position over the access opening, locking elements, stacking elements, etc.

In order to further diminish the risk that the contents get caught on the upper reinforcing rim, the rim may have a cross-sectional shape such that it tapers in a direction from the upper edge of the upper reinforcing rim towards the lower edge of the upper reinforcing rim. An upwardly tapering shape of the upper reinforcing rim provides the access opening with a slight funnel shape and aids in pouring contents out of the packaging container. A downwardly tapering shape of the upper reinforcing rim provides a neat lower transition between the rim and the inner surface of the container wall. The upper reinforcing ring may be continuously tapering with a generally wedge-shaped cross-section, or may have a tapering shape only in the upper portion of the reinforcing rim or in the lower portion of the reinforcing rim or may be designed with a cross-section which tapers downwardly or upwardly in a step-wise fashion. Combinations of cross-sectional shapes with gradually changing thickness and stepwise changing thickness of the upper reinforcing rim are also conceivable.

The container as disclosed herein may comprise mating stacking members for allowing two or more packaging containers to be arranged in a stacked configuration. The mating stacking members may be arranged at the container bottom and at the container opening.

A stacking member or stacking members at the container opening may be arranged peripherally on the container lid and/or on a frame connected to the upper reinforcing rim surrounding the access opening in the packaging container and/or on the upper reinforcing rim. Container lids may be provided with mating stacking members arranged on the upper outer surface and on the inner lower surface of each lid, making the lids separately stackable before being applied to a packaging container, e.g. in a process for producing the packaging containers as disclosed herein. In a similar fashion container lid components comprising a lid part hingedly connected to a frame may be provided with mating stacking members making the lid components separately stackable.

A stacking member at the container opening may take the form of a peripheral ledge on the outer lid surface or on the upper reinforcing rim or a frame connected to the reinforcing rim. When one container is stacked on top of another container, a bottom edge of the top container which extends downward from a container bottom disc in the height direction may rest on the peripheral ledge.

As an alternative to a continuous or discontinuous ledge at the periphery of the outer lid surface, stacking members at the container opening may be provided as two or more support surfaces cooperating with corresponding stacking members at the bottom of the container. The stacking members at the bottom of the container may be in the form of a downwardly extending bottom edge as set out above or may be in the form of knobs or other protrusions providing a desired spacing between a container bottom plate and the peripheral ledge or other support surface on which the stacking member or members at the bottom of the container are resting when one container is stacked on top of another.

The packaging container as disclosed herein may be a container for pulverulent or granulated consumer goods, including alimentary or consumable products such as formula, tea, coffee, cocoa, sugar, flour, tobacco, etc., as well as house-hold chemicals such as detergents and dishwasher powder. The pulverulent or granulated products which are suitable for packaging in the packaging containers as disclosed herein are flowable, which means that a desired amount of the product may be poured or scooped out of the packaging container.

The container body of the packaging container as disclosed herein may have four main body wall portions; a front wall portion arranged opposite a rear wall portion and two opposing side wall portions extending between the front wall portion and the rear wall portion. The body wall portions are connected at corners or corner portions which may be formed between planar surfaces arranged at right angles to each other or may be curved or bevelled corner portions providing the packaging container with a softer, slightly rounded appearance. Moreover, the shape of the body wall portions may deviate from a planar shape, with one or more of the body wall portions having an outward or inward curvature. When the container body has one or more outwardly curved body wall portion the curvature of any such body wall portion is always lesser than the curvature of any curved corner portion, i.e. a radius of curvature of a corner portion in the container body of the packaging container as disclosed herein is always smaller than any radius of curvature of a body wall portion. A transition between a corner portion and a body wall portion may be seen as a distinct change in curvature or may be seen as a continuous change in curvature.

Furthermore, the container body can be made without any distinct body wall portions and may have any suitable foot-print shape, such as circular, oval or elliptic.

The front wall portion of the container body wall may have an outwardly curved shape with a radius of curvature of from 70-500 mm. Thus, the container body may have a generally D-shaped cross-section. The outwardly curved front wall portion has the advantage of providing a relatively large and perceptible surface that may be used for a display function, e.g. for printing brand names, illustrations or instructions. Moreover, the container body having a generally D-shaped cross-section is space-saving, since it may be positioned close up to e.g. a kitchen wall or a cupboard wall.

The corner portions of the packaging container may be curved corner portions having a radius of curvature of from 15-100 mm.

In paperboard containers, there is a conflict between minimizing the amount of paperboard material used in the containers and making the containers sufficiently rigid to avoid that the containers are damaged or that they collapse, e.g. when stacked for transport and storage. It has been found that by making all container walls only slightly outwardly curved, shape stability and rigidity of the packaging container may be considerably improved as compared to conventional packaging containers having planar walls. Accordingly, the radii of curvature of the upper and lower end edges which govern the curvature of the container walls are preferably selected such that the container walls are provided with a near-planar shape, implying that the container walls are perceived by a consumer as being planar.

As set out herein, at least one of the container wall portions may have a radius of curvature of from 200 millimeters to 700 millimeters, such as from 300 to 500 millimeters implying that the container wall portion is near-planar. A near-planar wall portion is perceived by the naked eye as being planar when viewed from a normal viewing distance, such as when placed on a shelf. A packaging container having all body wall portions being near-planar is generally perceived as having a cuboid shape, i.e. the human eye will see the container body as having square or rectangular side walls and bottom.

A rigid plastic upper reinforcing rim as disclosed herein which is welded to the inner surface of the container body wall contributes to shape and stabilize the flexible paperboard container body opening edge and thereby ascertains that the container body wall is provided with a desired shape and in particular that the container body wall can be imparted with a predetermined and stable curvature. In a corresponding manner, when the packaging container as disclosed herein is provided with a bottom rim, the bottom rim further contributes to shape and stabilize the container body bottom edge and the container body wall. As set out herein, the packaging container may be provided with any desired tubular shape by bringing the body wall edge to conform to a rigid plastic upper reinforcing rim having the desired footprint shape. The container body shape can optionally be further stabilised by means of a rigid bottom rim having the desired footprint shape and being attached to the container body at the container bottom edge.

BRIEF DESCRIPTION OF THE DRAWINGS

The present invention will be further explained hereinafter by means of non-limiting examples and with reference to the appended drawings wherein.

DETAILED DESCRIPTION

Figure 1:
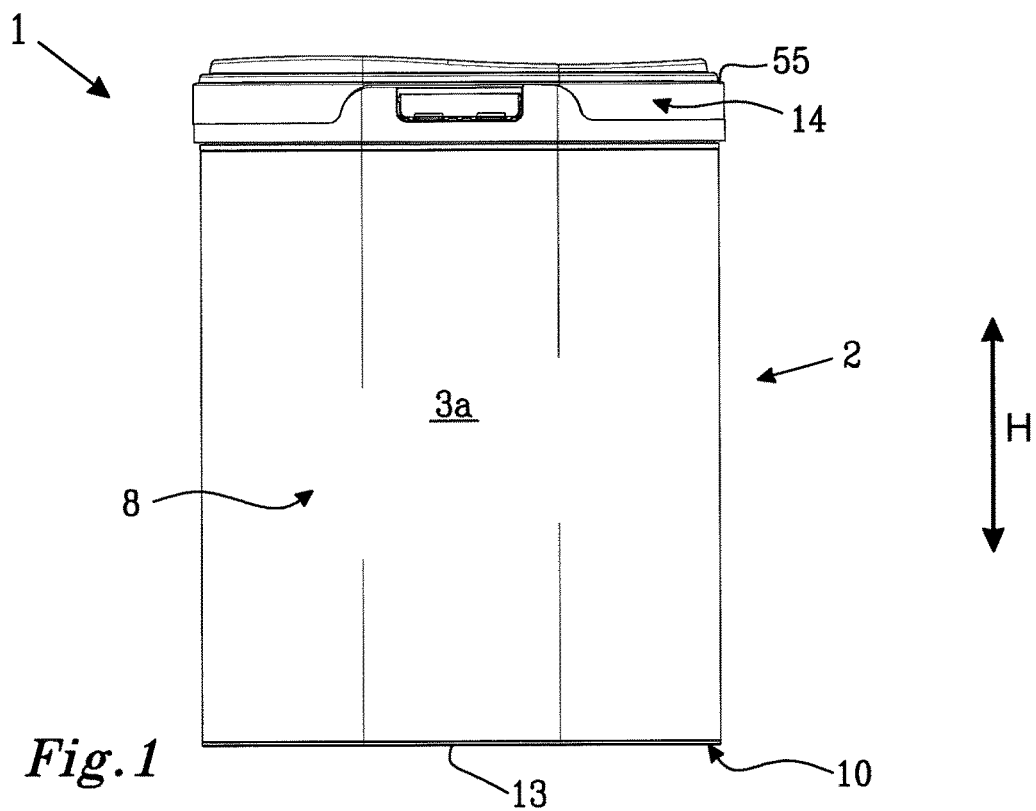
FIG. 1 shows a front view of a packaging container.

It is to be understood that the drawings are schematic and that individual components, such as layers of material are not necessarily drawn to scale. The packaging container, reinforcing rim and lid component shown in the figures are provided as examples only and should not be considered limiting to the invention. Accordingly, the scope of the invention is determined solely by the appended claims.

With reference to FIGS. 1-4, and FIG. 5A there is shown a paperboard packaging container 1 for pourable or scoopable bulk solids. The particular shape of the container 1 shown in the figures should not be considered limiting to the invention. Accordingly, the paperboard packaging container according to the invention may have any useful shape or size. By way of example, further non-limiting container body foot-prints are shown in FIG. 6.

The packaging container 1 comprises a container body 2 formed by a tubular container wall 3 including a front wall portion 3a, a rear wall portion 3b and two side wall portions 3c, 3d. The container wall 3 extends from a container body bottom edge 4 to a container body opening edge 5 at a container body opening 6 in a height direction H of the packaging container 1. The container wall 3 has an inner surface 7 facing towards an inner compartment 11 in the packaging container 1 and an outer surface 8 facing away from the inner compartment 11 and being exposed to the exterior of the packaging container 1. A bottom disc 9 is positioned at the bottom edge 4 of the container body 2. The container body 2 is made from paperboard material as defined herein. The container body 2 may be formed by bringing together the side edges of a web of paperboard causing the material to assume a tubular shape, where after the side edges are sealed together. Sealing of the side edges may be made by any suitable method as known in the art, such as by welding or gluing, with welding being preferred. Sealing of the side edges of the container body web may involve using a sealing strip, as known in the art. The bottom disc 9 may be made from paperboard, metal, plastic, or from any suitable combination of such materials as known in the art.

The container body bottom edge 4 is reinforced by a plastic bottom rim 10 which is applied to the inner surface 7 of the container wall 3, between the bottom disc 9 and the container body bottom edge 4 and which has an outwardly directed flange 12 which covers the container body bottom edge 4 and forms a bottom edge 13 of the packaging container 1. The bottom rim 10 reinforces the container body paperboard bottom edge 4, stabilizes the shape of the container body 2 and protects the container body bottom edge 4 from mechanical deformation. The plastic bottom rim 10 also serves as a protective barrier against water and other fluids which may be present on a surface on which the packaging container is placed. The bottom rim 10 delimits a downwardly open space between the bottom disc 9 and the bottom edge 13 of the packaging container 1 which may be used to accommodate stacking elements arranged at an upper end of another packaging container when stacking two or more packaging containers on top of each other.

As an alternative to a plastic bottom rim, the bottom edge of the packaging container may be formed by a rolled edge of the paperboard container body, or may be provided by a simple, non-rolled join between the bottom disc 9 and the container body 2.

The paperboard packaging container 1 is provided with a closure arrangement comprising a lid 14 and an upper reinforcing rim 15 extending along the container body opening edge 5 and defining a perimeter of a container access opening 35 which is smaller than the container body opening 6 which is defined by the upper edge 5 of the container body 2.

The upper reinforcing rim 15 is preferably a plastic rim, most preferably a thermoplastic rim and is attached to the inner surface 7 of the container body wall 3 at the container body opening 6. The upper reinforcing rim 15 has an extension in the height direction, H, of the container 1 and has a lower rim part 16 with a lower rim edge 17 facing towards the container bottom 9 and an upper rim part 18 with an upper rim edge 19 facing away from the container bottom 9. The upper reinforcing rim 15 extends around the full periphery of the container body opening 6. The upper rim part 18 protrudes upwards in the height direction, H, above the container body opening edge 5, whereby the upper edge 19 of the upper reinforcing rim 15 is arranged above the container body opening edge 5 in the height direction, H, of the packaging container 1.

The upper reinforcing rim 15 is joined to the inner surface 7 of the container wall 3 by means of a weld seal 20 extending around the container opening 6. The weld seal 20 preferably extends continuously around the container body opening 5 and is a sift-proof weld seal and is preferably also a moisture proof weld seal and most preferably a gas-tight weld seal.

The weld seal 20 is formed by supplying energy to heat and locally soften or melt one or more thermoplastic component in a thermoplastic rim 15 and/or in a coating or film on the inner surface 7 of the container body wall 3 and by pressing the reinforcing rim 15 and the container wall 3 together in a direction perpendicular to the container wall 3. The temperature and pressure can be controlled and adjusted to form a strong and tight seal without damaging the welded components. The thermoplastic material used to create the weld seal 20 may be provided by a fully or partly thermoplastic reinforcing rim 15, by a thermoplastic film or coating on the inner surface 7 of the container wall 3, or by both a fully or partly thermoplastic reinforcing rim and by a thermoplastic film or coating on the inner surface 7 of the container wall 3. A plastic reinforcing rim 15 is preferably made from thermoplastic material which allows it to be thermoformed, e.g. by injection molding. An injection molding process may be used to form plastic components having different polymer compositions in different parts of the plastic component. By way of example, the surface of a plastic reinforcing rim which is welded to the container body may be formed from a polymer composition having a lower softening and melting point than other parts of the reinforcing rim. Moreover, an abutment surface on the upper reinforcing rim 15 may be formed from a resilient thermoplastic polymer. Any suitable welding technique may be used, such as ultrasonic welding or high frequency welding, with high frequency welding being preferred.

Figure 4:
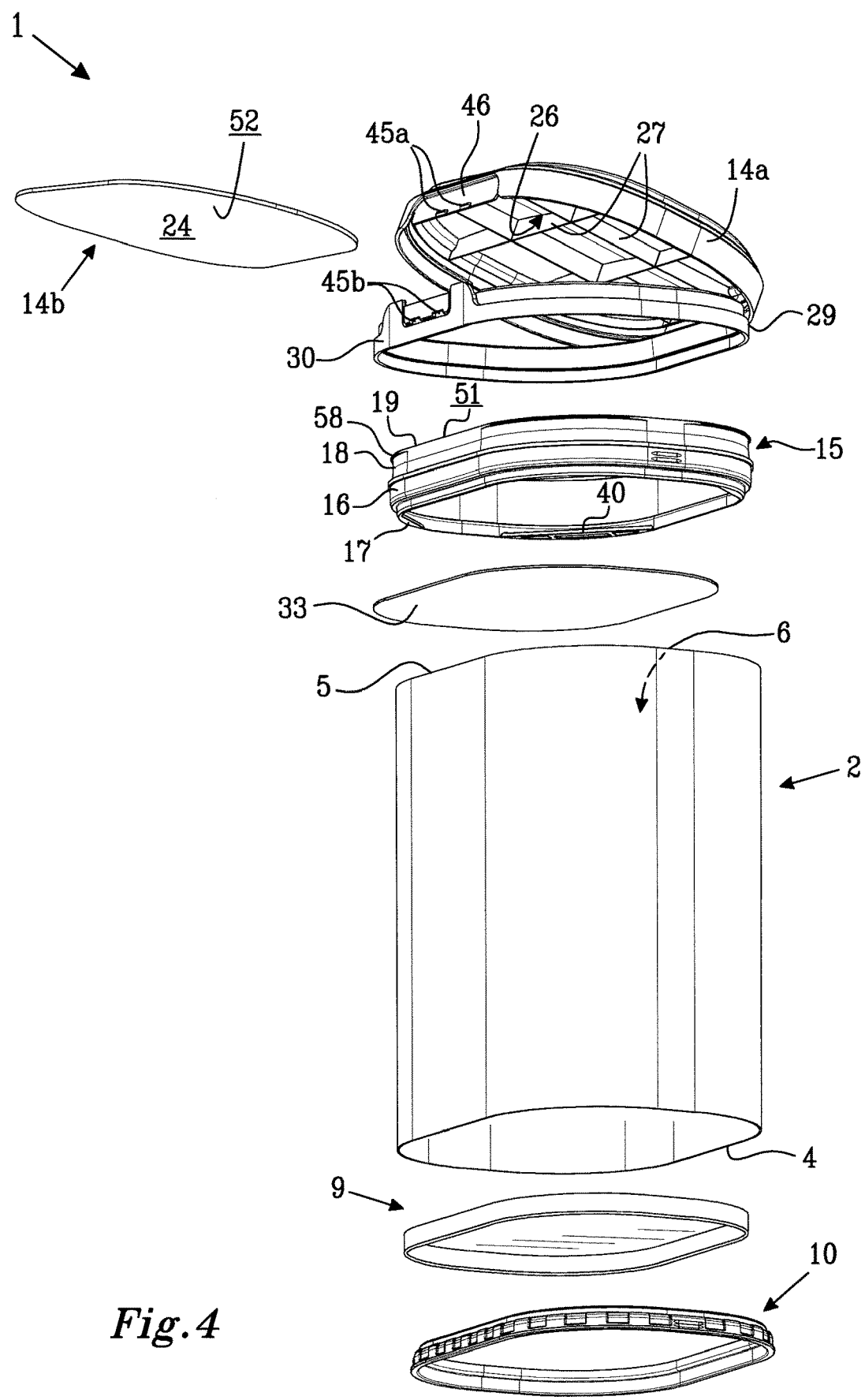
FIG. 4 shows an exploded view of the packaging container in FIG. 1.

The lid 14 is formed from an outer lid part 14a and an inner lid part 14b. The outer lid part 14a is a profiled part with a three-dimensional shape providing an upper outer surface 25 of the lid 14. As is shown in FIG. 4, the outer lid part 14a has an inner surface 26 comprising a pattern of reinforcing ribs 27. The inner lid part 14b is a planar disk. The inner lid part 14b has an inner lid surface 24 which faces towards the bottom disc 9 when the lid 14 is closed on the container access opening 35.

The outer lid part 14a is connected by a hinge 29 to a frame structure 30, the lid 14 and the frame structure 30 together forming a lid component 31. With reference to FIG. 5D, the hinge 29 is shown to be a live hinge, formed integrally with the upper lid part 14a and the frame structure 30 as a flexible connection between the upper lid part 14a and the frame structure 30. As set out herein, the illustrated hinge is only intended as a non-limiting example and it should be understood that any other type of functional hinge may be used for the connection between the frame structure and the lid. Moreover, the lid may be of the removable kind, without any permanent connection to the frame structure.

The frame structure 30 is applied to the packaging container at the container body opening edge 5 and is mechanically attached to the upper reinforcing rim 15 by a snap-on connection. The frame structure 30 is attached to the upper reinforcing rim 15 after the reinforcing rim 15 has been welded to the inner surface 7 of the paperboard container wall 3. Accordingly, the frame structure can be attached at a late stage in a process for assembling and filling the packaging container as disclosed herein. The frame structure 30 is applied to the upper reinforcing rim 15 by pressing the frame structure 30 down over the upper edge 19 of the upper reinforcing rim 15 until the frame structure 30 locks in place on the upper reinforcing rim 15 as is described in more detail herein with reference to FIG. 5E. When the frame structure 30 has been attached to the upper reinforcing rim 15, it can only be removed again by breaking or damaging the connection.

Figure 3:
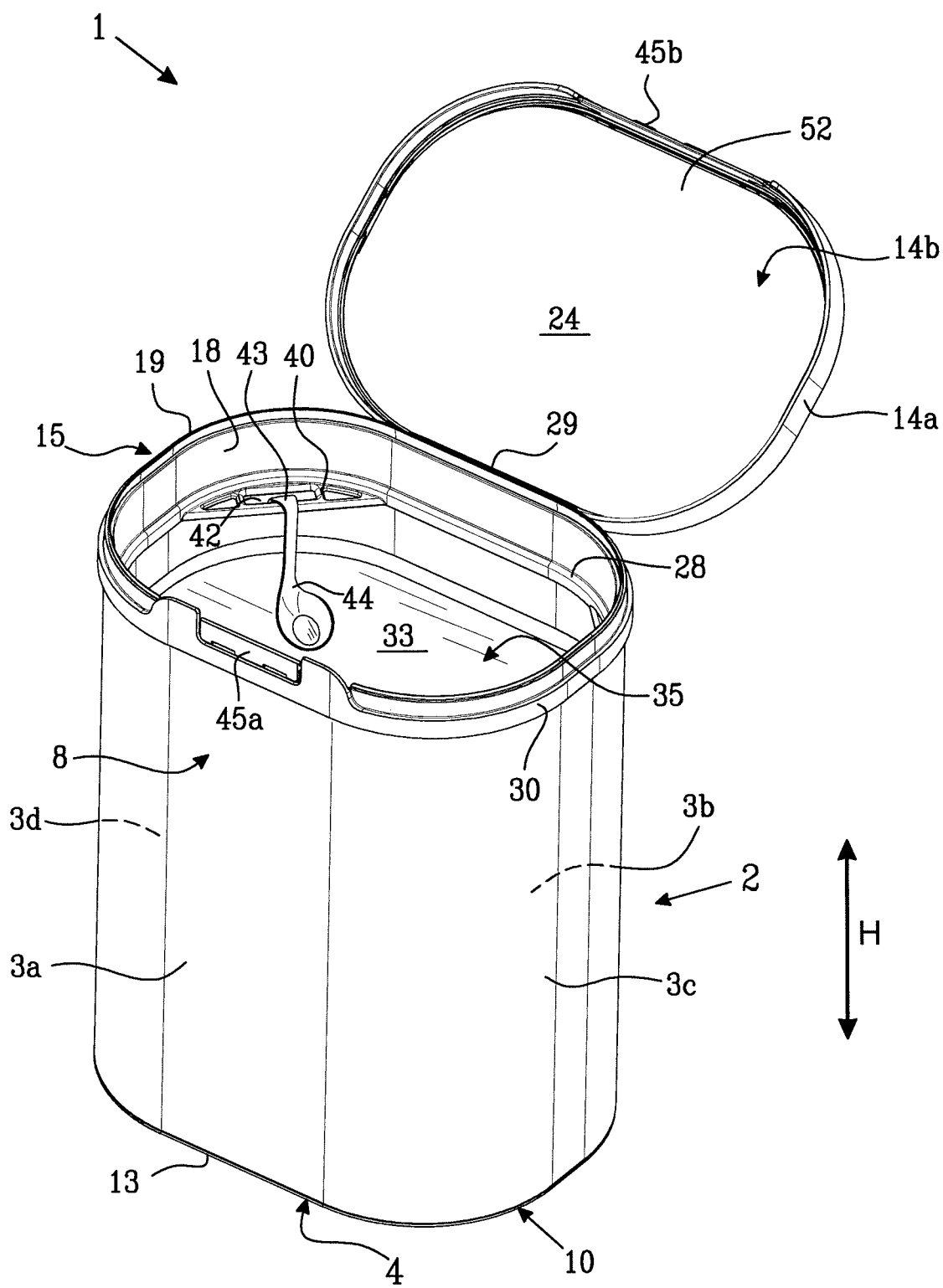
FIG. 3 shows a perspective view of the packaging container in FIG. 1 with an open lid.
Figure 5A:
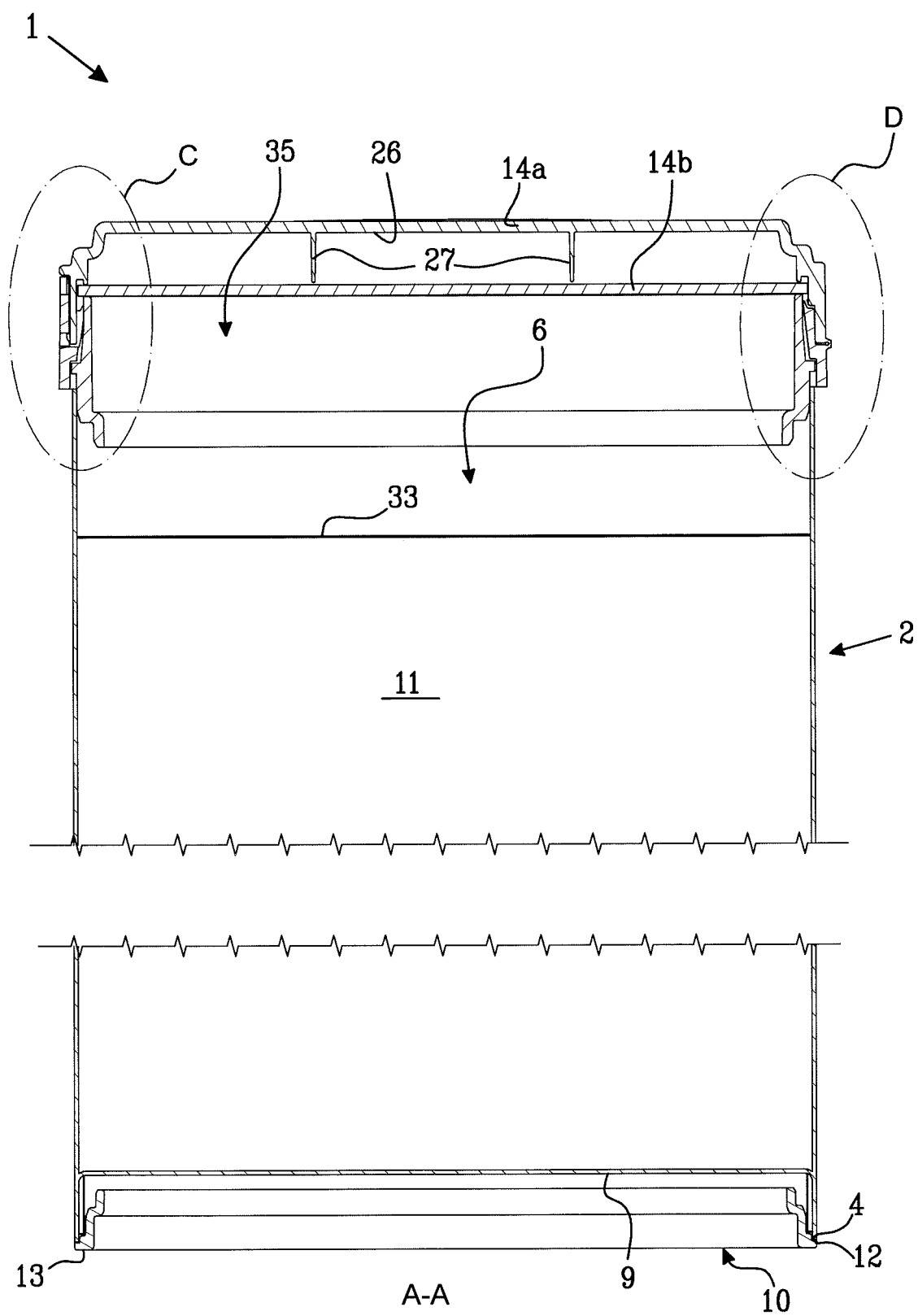
FIG. 5A shows a cross-section taken along the line A-A in FIG. 5.
Figure 5:
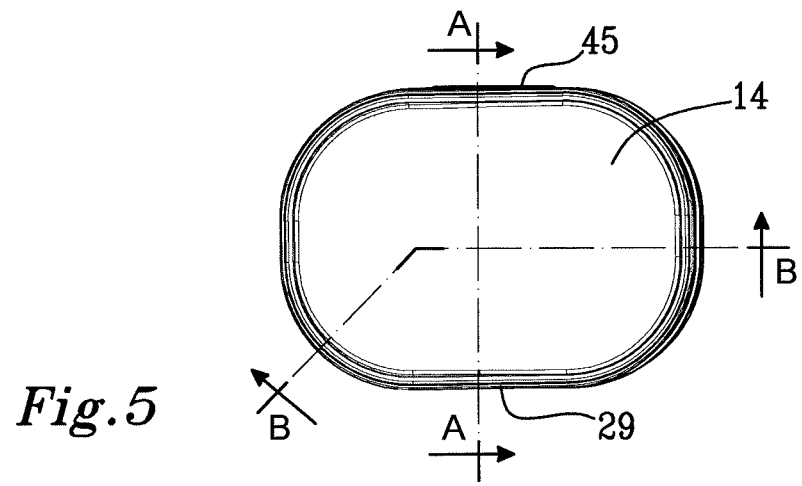
FIG. 5 shows a top view of the packaging container in FIG. 1.
Figure 5C:
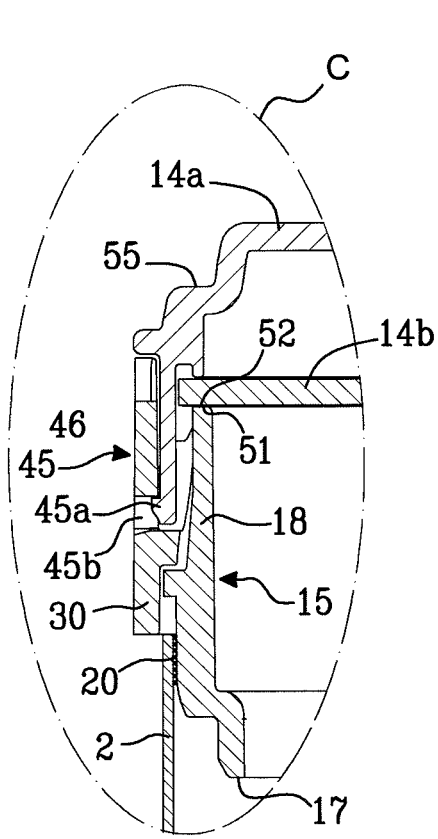
FIG. 5C shows a detail of a container body edge with an attached upper reinforcing rim and a lid component taken at C in FIG. 5A.
Figure 5D:
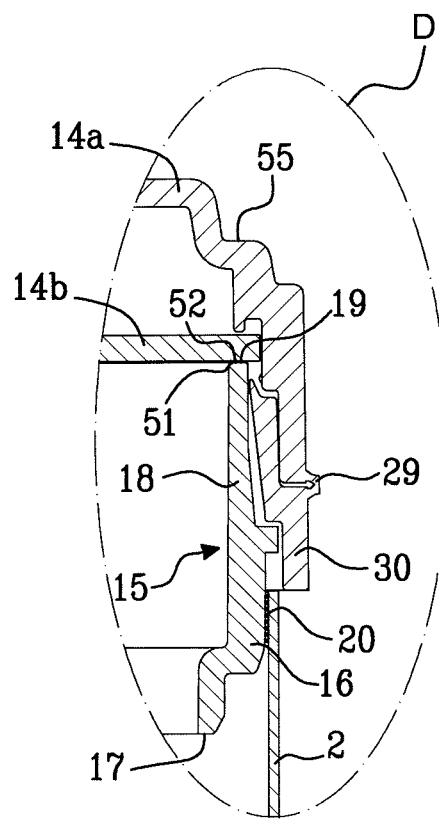
FIG. 5D shows a detail of a container body edge with an attached upper reinforcing rim and a lid component taken at D in FIG. 5A.
Figure 5B:
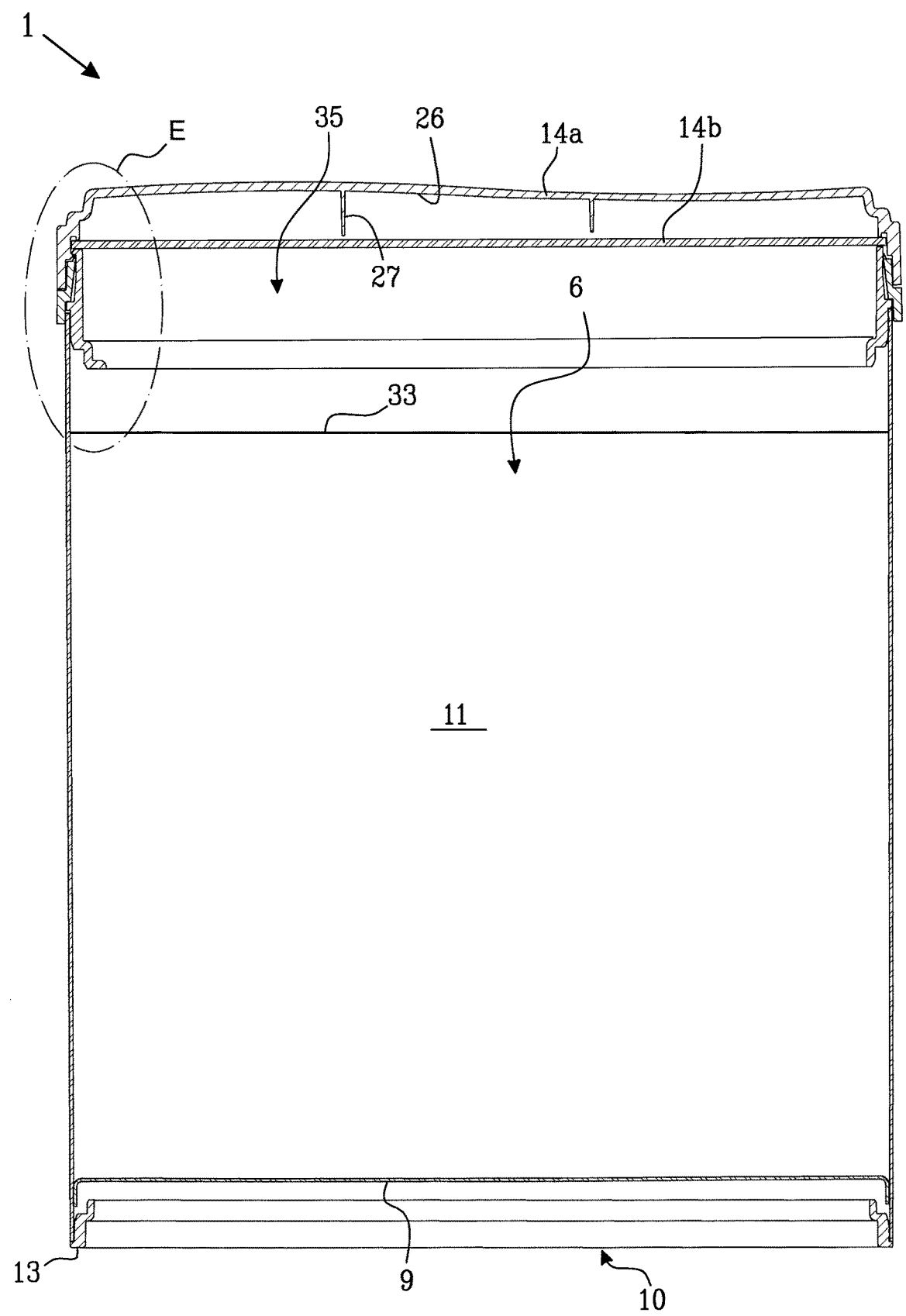
FIG. 5B shows a cross-section taken along the line B-B in FIG. 5.

The interior compartment 11 shown in FIGS. 3, 5A and 5B is sealed with a fully or partly removable sealing membrane 33 which is applied over the packaged goods 34 and which is sealed to the container body wall 3. The removable sealing membrane 33 may be attached to the container wall either from the top end of the container body 2 or from the bottom end of the container body 2. In order to gain a first access to the packaged goods, a user needs to open the lid 14 and expose the packaged goods 34 by fully or partly removing the sealing membrane 33. The sealing membrane 33 may be arranged to be peeled away from the wall 3 of the container body 2 or may be arranged with means for breaking the membrane 33 so that it can be at least partly removed from the opening 6, 35. Such means may be in the form of one or more predefined weakenings, such as perforations or a cut partly through the membrane. When the membrane is of the tear-open type, a narrow edge part of the sealing membrane may be left at the inner surface 7 of the container wall 3. Any such remaining part of the sealing membrane should preferably not be so large so that it extends into the access opening which is defined by the inner perimeter of the upper reinforcing rim. Accordingly, it may be preferred that a remaining membrane part has an extension perpendicular to the height direction H of the packaging container of at most 7 millimeters such as from 1-6 millimeters, from 2-5 millimeters or from 3-4 millimeters. It may be preferred that the inward extension of a remaining membrane part is 4 millimeters or less. The sealing membrane 33 is an optional feature of the disclosed packaging container 1 and may be omitted.

Once the sealing membrane 33 has been removed, it is sufficient to open the lid 14 in order to gain access to the packaged goods 34 in the interior compartment 11 through the access opening 35. As is seen in FIG. 3, which reveals the inside of the upper reinforcing rim 15, the area of the access opening 35 is defined by an inner perimeter 28 or inner contour of the upper reinforcing rim 15. As the upper reinforcing rim 15 is applied on the inner surface 7 of the container body wall 3 and adds thickness to the body wall in an inward direction, the area of the access opening 35 is always smaller than the area of the container body opening 6. The upper reinforcing rim 15 which is shown in FIGS. 3 and 4 has a combined scraper bar and scoop holder 40 which extends across a corner portion of the reinforcing rim 15. The combined scraper bar and scoop holder 40 is provided with a scraping edge 41 for scraping off excess scooped-up contents from a scoop or spoon and an eye 42 for receiving and holding a hook element 43 arranged at the end of a scoop or spoon 44. The combined scraper bar and scoop holder 40 is an optional element of the packaging container 1 as disclosed herein.

When the packaging container 1 is open, a desired quantity of the packaged goods 34 may be removed from the packaging container 1 through the access opening 35 either by hand, by using a scoop or a spoon, or by pouring. If a scoop or spoon is used, it may be a scoop or spoon which is provided together with the packaging container. The scoop or spoon may initially be placed on the sealing membrane 33, if present, may be removably attached to the inner lid surface 26 or may be attached to a scoop holder 40 as shown in FIG. 3. The scoop or spoon 44 may be provided with a hook element 43 which hook element is arranged to cooperate with the eye 42 in a combined scraper bar and scoop holder 40, as set out above whereby the scoop or spoon 44 may be attached to the reinforcing rim 15 such that the handle on the scoop or spoon is prevented from falling down into the contents in the packaging container between dispensing occasions. Users may find it more appealing and hygienic to be able to remove the scoop from the container without having to dig it out from the remaining contents in the packaging container. An advantage with combining the holding function with a scraper function, is that the combined scraper bar and scoop holder 40 intrudes minimally on the open area of the access opening 35. Accordingly, even if provided with the combined scraper bar and scoop holder 40 as disclosed herein, the packaging container has a large access opening which greatly facilitates removal of the contents from the packaging container either by scooping or by pouring.

The access opening 35 may have an opening area which is from 85% to 99% of the opening area of the container body opening 6, such as from 90% to 98% of the container body opening area or from 94% to 97% of the container body opening area.

A tight closure between the lid 14 and the container body 2 is provided by a first abutment surface 51 on the upper rim edge 19 and a corresponding second abutment surface 52 arranged on the inner lid surface 24. The first abutment surface 51 on the upper reinforcing rim 15 is arranged to abut against the second abutment surface 52 on the lid 14 when the lid is in the closed position on the container access opening 35 and to form a seal between the upper reinforcing rim 15 and the lid 14.

In order to keep the lid 14 secured in the closed position between dispensing occasions, the closure arrangement of the packaging container 1 may further comprise a locking arrangement 45, as seen in FIGS. 5A and 5C. The locking arrangement 45 may comprise mating locking elements 45a, 45b, as illustrated in FIG. 5C. A male locking element 45a is arranged on the lid 14 and a female locking element 45b is arranged on the frame structure 30 which is indirectly attached to the container body 2 by being mechanically attached to the upper reinforcing rim 15. The male locking element 45a is constituted by one or more protrusions, such as one or more knobs or ribs arranged on a locking flap 46 and the female locking element 45b is constituted by one or more corresponding cavities or grooves arranged on the frame structure 30. The locking arrangement 45 is preferably designed such that it exerts a force on the connection between the lid 2 and the upper rim edge 19 by pressing the first and second abutment surfaces 51, 52 together.

The paperboard packaging container 1 shown in FIGS. 1-4 may be stacked on another such packaging container 1 by resting the bottom rim 10 on a ledge 55 at the periphery of the upper outer lid surface 25, the bottom rim 10 and the ledge 55 thus forming mating stacking members. As can be seen in FIGS. 1, 2, 5A and 5D, the portion of the lid 14 inside the ledge 55 forms a protrusion from the plane in which the ledge 55 is arranged, which plane may be considered to be a horizontal base plane for the lid 14. When one packaging container 1 is stacked upon another identical packaging container, the protruding portion of the lid 14 is fully accommodated in the space defined by the bottom disc 9 and the bottom rim 10 at the bottom of an upper stacked packaging container. Accordingly, the packaging containers can be safely stacked on top of each other in a stable and horizontal arrangement even if the lids 14 have a three-dimensional shape.

The lid components 31 are also separately stackable when in a closed position, by resting the lower edge of one frame structure 30 on a ledge on the upper outer lid surface of the upper lid part 14a.

Figure 5E:
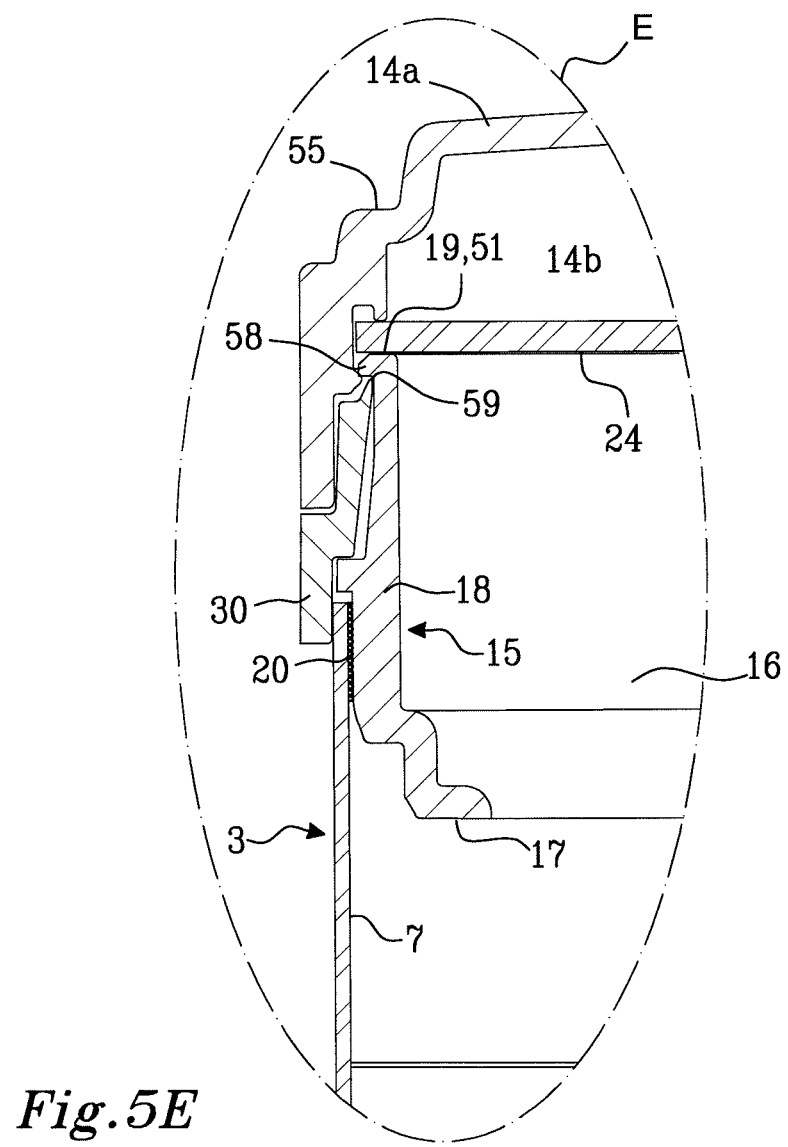
FIG. 5E shows a detail of a container body edge with an attached upper reinforcing rim and a lid component taken at E in FIG. 5B.

The arrangement of the lid component 31 on the upper reinforcing rim will now be described in greater detail. FIG. 5A shows a cross-section taken along the line A-A through the packaging container shown in FIG. 5, i.e. through the locking arrangement 45 at the front of the packaging container 1 and through the hinge between the upper lid part 14a and the frame structure 30 at the rear of the packaging container 1. In these particular areas, there is no mechanical engagement between the upper reinforcing rim 15 and the lid component 31. FIG. 5B shows a cross-section taken along the line B-B through the packaging container shown in FIG. 5, i.e. through a corner portion of the packaging container. FIGS. 5C, 5D and 5E show details taken from FIGS. 5A and 5B of the combined frame structure 30 and the upper reinforcing rim 15 in the area of the locking arrangement 45, in the area of the hinge 29 and in a part free of such additional features.

With particular reference to FIG. 5E which illustrates the coupling between the upper reinforcing rim 15 and the frame structure 31, the lower part 16 of the upper reinforcing rim 15 is permanently attached to the inner surface 7 of the container wall 3 with the weld seam 20, such that the lower edge 17 of the reinforcing rim 15 is facing downward in the height direction H and with the upper part 18 of the reinforcing rim 15 protruding past the upper edge 5 of the container wall 3. The upper edge 19 of the reinforcing rim 15 forms a first abutment surface 51 which abuts against a second abutment surface 52 on the inner surface 24 of the inner lid part 14b. Accordingly, the lid 14 closes on the packaging container 1 by forming a tight seal between the upper reinforcing rim 15 and the inner surface 24 of the lid 14 while the frame structure 30 provides attachment for the lid 14, and can be shaped and configured for carrying hinge elements, locking elements and stacking means without any concern for providing a tight closure between the lid and the container. The weld seal 20 forms a tight contaminant-free seal on the inside of the container 1 and ascertains that the seal between the closed lid 14 and the container compartment 11 is a tight seal which means that the packaging container can be tightly sealed also after a first opening of the packaging container.

FIG. 5E shows the upper reinforcing rim 15 with an outwardly protruding ridge 58 which is arranged to engage with a locking flange 59 at the upper edge of the frame structure 30 when the frame structure 30 has been pressed down over the upper reinforcing rim 15. Once the frame structure 30 has been completely pressed down on the upper reinforcing rim and the locking flange 59 on the frame structure 30 has been moved past the ridge 58 on the upper reinforcing rim 15 and snapped into a locking engagement with the ridge 58, the frame structure 30 will remain mechanically attached to the reinforcing rim 15. The only way the snap-fitted frame structure 30 can be removed from the reinforcing rim 15 is by forcefully breaking or destroying the connection.

Figure 2:
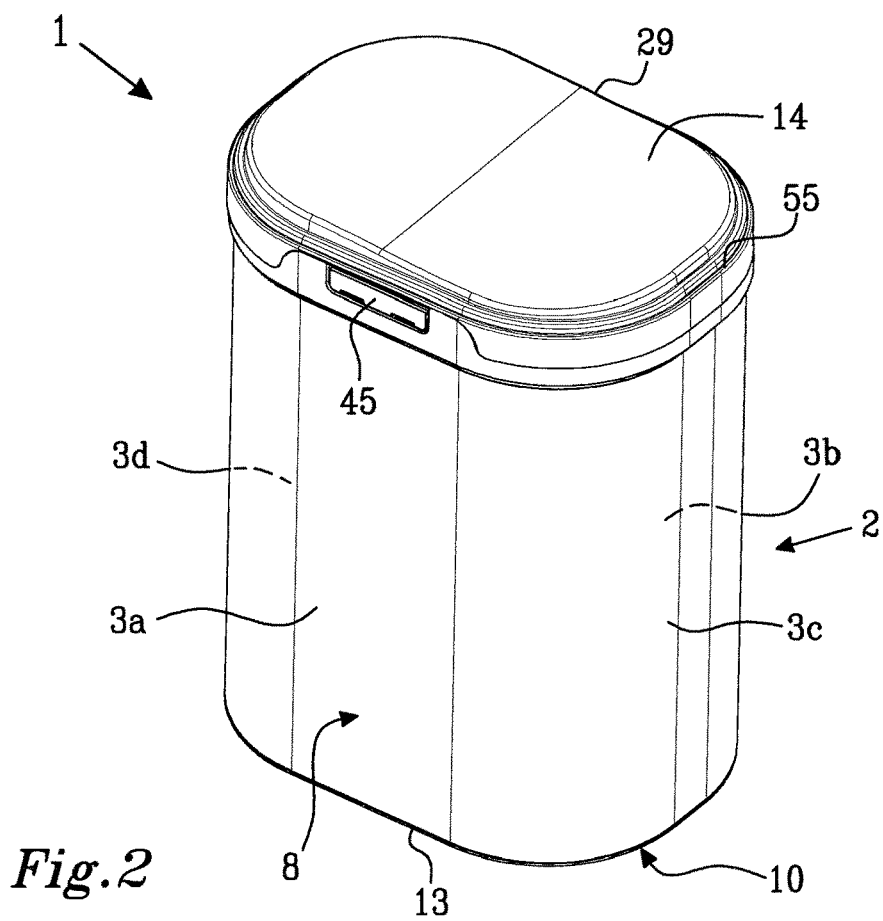
FIG. 2 shows a perspective view of the packaging container in FIG. 1.
Figure 6A:
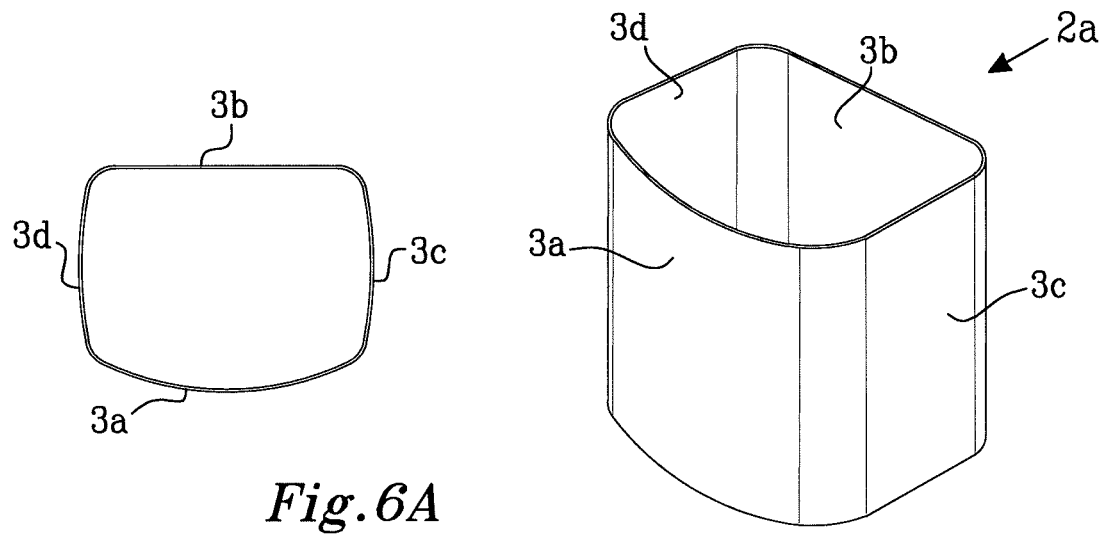
FIG. 6A-6C show alternative packaging body foot-prints.
Figure 6B:
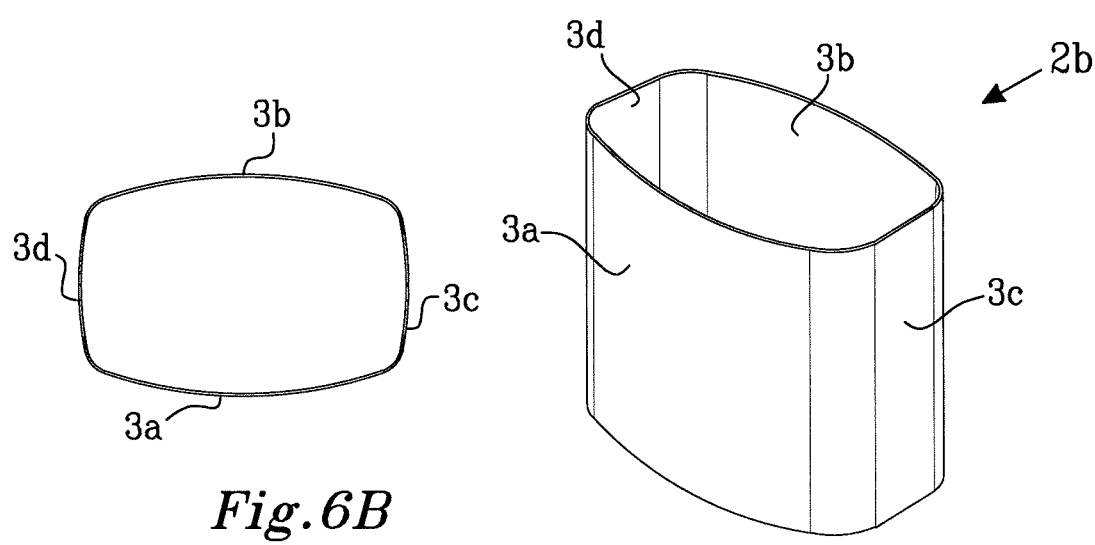
Figure 6C:
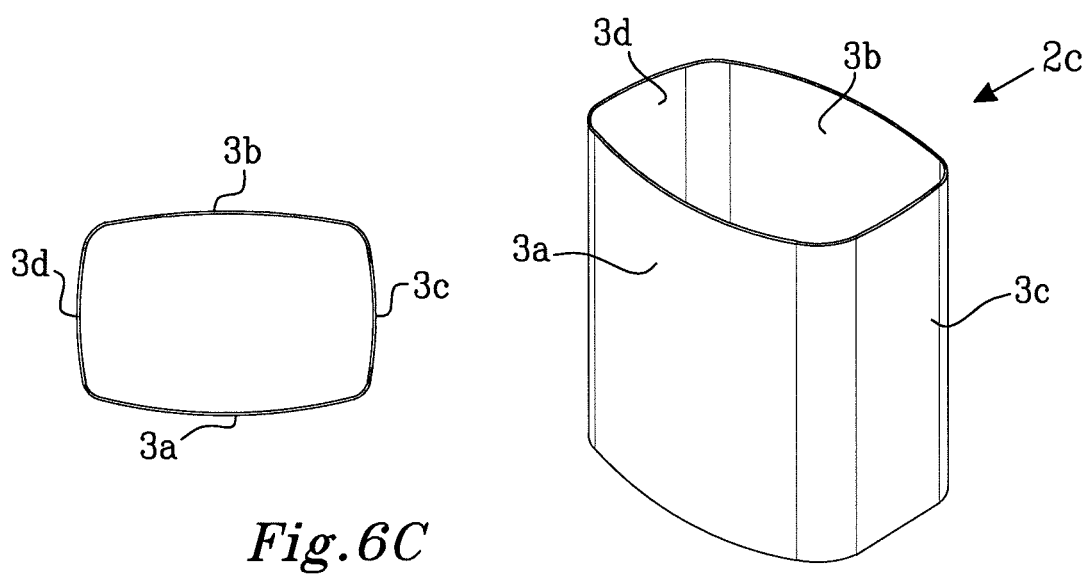

The shape of the packaging container as disclosed herein is not limited to the generally rectangular shape with rounded corners which is shown in FIGS. 1-3. Further non-limiting examples of useful shapes are shown in FIGS. 6a-6c. FIG. 6a shows a container body 2a having a generally D-shaped footprint with an outwardly curved front wall portion 3a with a radius of curvature of 120 millimeters, curved corners having a radius of curvature of 25 millimeters at the front wall portion 3a and a radius of curvature of 20 millimeters at the rear wall portion 3b, planar side wall portions 3c, 3d and a planar rear wall portion 3b.

The container body 2b in FIG. 6b has curved corners with a radius of curvature of 20 millimeters, curved front and rear wall portions 3a, 3b with a radius of curvature of 150 millimeters and planar side wall portions 3c, 3d.

The container body 2c in FIG. 6c has curved corners with a radius of curvature of 20 millimeters, slightly curved front and rear wall portions 3a, 3b with a radius of curvature of 400 millimeters and slightly curved side wall portions 3c, 3d with a radius of curvature of 200 millimeters. Accordingly, all the container body wall portions 3a-3d in FIG. 6c are slightly outwardly curved. A container body having the foot-print shown in FIG. 6c has improved shape stability and rigidity as compared to conventional packaging containers having planar walls. The radii of curvature of the upper and lower body wall edges govern the curvature of the container walls and may be selected to have a large radius of curvature in the order of from 200 millimeters to 700 millimeters, such as from 300 to 500 millimeters such that the container walls are provided with a near-planar shape, implying that the container walls are perceived by a human being as being planar when looking at the container from a normal viewing distance such as when the packaging container is placed on a shelf.

The rigid plastic upper reinforcing rim 15 as disclosed herein which is welded to the inner surface 7 of the container body wall 3 contributes to shape and stabilize the container body opening edge 5 and also ascertains that the container body wall is provided with a desired shape and in particular that the container body wall can be imparted with a predetermined and stable curvature. In a corresponding manner, when the packaging container as disclosed herein is provided with a bottom rim 10, the bottom rim 10 further contributes to shape and stabilize the container body bottom edge 4.

Any plastic component in the packaging container as disclosed herein such as an upper and a lower reinforcement rim, a lid component, and a frame structure may be formed from thermo-formable or moldable plastic materials, e.g. by injection molding. Injection molding is particularly suitable for producing plastic components having a three-dimensional structure, such as the lid component 31 shown in FIG. 4.

It should be understood that the lid construction shown herein is optional to the packaging container of the claimed invention. In particular, a lid for a packaging container as disclosed herein may be made without an inner reinforcing framework, may be made as a single part, may be integrally formed with a plastic frame structure and a hinge, as shown in FIG. 4 or may be formed as a separate part which may be provided with a hinge element for creating a hinged connection to a container body or to a separate frame structure which is attached to the upper reinforcing rim 15.

It is also to be understood that the outer three-dimensional shape of the lid may be different from that shown in the figures.

A packaging container as disclosed herein may be produced and filled by forming a tubular container body from a paperboard sheet, welding an upper reinforcing rim to the inner surface of the paperboard container body wall at an opening end of the container body and applying a sealing membrane to the inner surface of the container body wall across the container body opening and at a distance from the upper reinforcing rim so as to close the container body opening. The packaging container is thereafter turned upside-down and filled with pulverulent contents from the bottom end of the container body, whereafter the bottom end of the container body is closed by a bottom disc and, optionally, a reinforcing bottom rim is applied to the bottom end of the container body. The filled packaging container may then be provided with a frame structure which is attached to the upper reinforcing rim either mechanically or by means of adhesive. A lid is also attached over the container body opening such that it forms a tight closure with the upper reinforcing rim. The lid can be provided as a separate component or as an integral part of a lid component which also comprises the frame structure.

It is an advantage of a lid construction as disclosed herein that a lid component or a frame structure can be attached to the upper reinforcing rim after the container has been filled and closed around the contents. In this manner, the risk that the lid component or frame structure is damaged in the production and filling process is minimized. Furthermore, by attaching the lid component or frame structure at a late stage in the process, the packaging container can be filled from the bottom end of the container body, which means that a sealing membrane can be applied in the packaging container before the container is filled. An advantage with applying the sealing membrane in the packaging container before the packaging container is filled with pulverulent material is that there is no risk that the seal between the membrane and the container wall is contaminated by the pulverulent material. Furthermore, there is no risk that any of the packaged pulverulent material will end up outside the sealing membrane, in the space between the lid and the sealing membrane, which may happen if the sealing membrane is applied after filling of the packaging container. A user opening a new packaging container for a first time and finding some of the contents outside the sealing membrane would consider the container to be less hygienic and reliable than a container in which the space between the sealing membrane and the lid is completely clean.

The invention claimed is:

1. A paperboard packaging container for bulk solids, said packaging container comprising: a container body having a container wall extending in a height direction and having a maximum height from a container bottom edge to a terminal container opening edge at a container body opening, and a closure arrangement having a lid, said container wall having an inner surface facing towards an inner compartment in said packaging container and an outer surface facing away from said inner compartment, and an upper reinforcing rim being applied to said container body at said container body opening said upper reinforcing rim extending along said opening edge and defining a perimeter of a container access opening, wherein
    said upper reinforcing rim is joined to said inner surface of said container wall by means of a weld seal, said weld seal extending around said container body opening,
    said upper reinforcing rim has an extension in said height direction of said container and has a lower edge facing towards said container bottom and an upper edge facing away from said container bottom,
    said upper edge of said upper reinforcing rim has a first abutment surface,
    said lid has an inner lid surface facing towards said container bottom when said lid is in a closed position on said container access opening and an outer lid surface facing away from said container bottom when said lid is in a closed position on said container access opening,
    said inner lid surface has a second abutment surface,
    said first abutment surface on said upper reinforcing rim being arranged to abut against said second abutment surface on said lid when said lid is in said closed position on said container access opening and to form a seal between said upper reinforcing rim and said lid when said lid is in said closed position over said container access opening, and wherein
    said closure arrangement further includes a frame structure, said frame structure being applied to said packaging container at said container body opening edge and being separate from and mechanically connected to said upper reinforcing rim, said frame structure forming part of a lid component, said lid component further including a lid part, said frame structure and said lid part being unitary and connected by a hinge, and
    said closure arrangement includes a locking arrangement being configured to maintain said lid in a closed position at said container access opening.

2. The paperboard packaging container according to claim 1, wherein said upper edge of said upper reinforcing rim is arranged above said container body opening edge in said height direction of said packaging container.

3. The paperboard packaging container according to claim 1, wherein said weld seal between said upper reinforcing rim and said container wall is a sift-proof weld seal and wherein said seal between said first and second abutment surfaces is a sift-proof seal.

4. The paperboard packaging container according to claim 1, wherein said weld seal extends continuously around said container body opening.

5. The paperboard packaging container according to claim 1, wherein said connection between said frame structure and said upper reinforcing rim is a snap-in connection.

6. The paperboard packaging container according to claim 1, further comprising an inner peelable or openable sealing membrane forming a cross-sectional seal between an inner compartment in said container body and said container opening.

7. The paperboard packaging container according to claim 6, wherein said container is a gas-tight packaging container and said inner peelable or openable sealing membrane is a gas-tight peelable or openable sealing membrane.

8. The paperboard packaging container according to claim 1, wherein one or both of said first and second abutment surfaces is constituted by resilient material.

9. The paperboard packaging container according to claim 1, wherein said locking arrangement includes a first locking element arranged on said frame structure and a second locking element arranged on said container lid, said first and second locking elements being mating female/male locking elements.

10. The paperboard packaging container according to claim 1, wherein said inner lid surface is constituted by an inner gasketing lid part.

11. The paperboard packaging container according to claim 1, wherein said upper reinforcing rim has a tapering shape in a direction from said upper edge of said upper reinforcing rim towards said lower edge of said upper reinforcing rim.

12. The paperboard packaging container according to claim 1, wherein said weld seal between said reinforcing rim and said container wall is formed by high frequency welding.

13. The paperboard packaging container according to claim 1, wherein an inner profile of said reinforcing rim defines a shape and a size of said access opening, said access opening being smaller than said container body opening and having an opening area, wherein said access opening area is from 85% to 99% of said container body opening area, 90% to 98% of said container body opening area or 94% to 97% of said container body opening area.

14. The paperboard packaging container according to claim 1, further comprising mating stacking members for allowing two or more of said packaging container to be arranged in a stacked configuration, said mating stacking members being arranged at said container bottom and at said container opening.

15. The paperboard packaging container according to claim 1, wherein said container is a container for pulverulent or granulated alimentary products.

16. The paperboard packaging container according to claim 1, wherein a lower reinforcing rim is attached to said container body, at said container bottom edge.

17. The paperboard packaging container according to claim 1, wherein said locking arrangement includes a first profiled element on said lid said first profiled element being configured to releasably engage with a second profiled element on said frame structure.

18. The paperboard packaging container according to claim 1, wherein said weld seal between said upper reinforcing rim and said container wall is a gas-tight weld seal and wherein said seal between said first and second abutment surfaces is a gas tight seal.

19. The paperboard packaging container according to claim 1, wherein said upper reinforcing rim has a tapering shape in a direction from said lower edge of said upper reinforcing rim to said upper edge of said upper reinforcing rim.

20. The paperboard packaging container according to claim 1, wherein said container wall has an outer surface intersecting and terminating at said terminal container opening edge.

* * * * *